United States Patent [19]

Takahashi

[11] Patent Number: 4,922,428

[45] Date of Patent: May 1, 1990

[54] SYSTEM AND METHOD FOR AUTOMATICALLY CONTROLLING CRUISING SPEED OF VEHICLES

[75] Inventor: Hiroshi Takahashi, Tokyo, Japan

[73] Assignee: Nissan Motor Company, Limited, Kanagawa, Japan

[21] Appl. No.: 130,473

[22] Filed: Dec. 9, 1987

[30] Foreign Application Priority Data

Dec. 10, 1986 [JP] Japan .................. 61-294418

[51] Int. Cl.⁵ ............................................. B60K 31/00
[52] U.S. Cl. ............................... 364/426.04; 180/179; 180/178; 364/565
[58] Field of Search ................... 364/431.07, 426.04, 364/565; 123/349, 361, 358; 180/170, 179, 176, 178

[56] References Cited

U.S. PATENT DOCUMENTS

| | | | |
|---|---|---|---|
| 4,211,193 | 7/1980 | Cox et al. ........................... | 364/426 |
| 4,467,428 | 8/1984 | Caldwell ........................... | 364/426 |
| 4,472,777 | 9/1984 | Youngblood ....................... | 364/426 |
| 4,520,778 | 6/1985 | Nanjo et al. ....................... | 180/179 |
| 4,540,060 | 9/1985 | Kawata et al. ..................... | 180/179 |
| 4,591,986 | 5/1986 | Nakajima et al. ................ | 364/431.07 |
| 4,598,370 | 7/1986 | Nakajima et al. ................ | 364/431.07 |
| 4,650,020 | 3/1987 | Mizumo et al. .................... | 180/176 |
| 4,707,792 | 11/1987 | Naitou ............................... | 180/176 |
| 4,723,213 | 2/1988 | Kawata et al. ..................... | 364/426 |
| 4,725,969 | 2/1988 | Onogi et al. ....................... | 364/426 |
| 4,735,273 | 8/1988 | Naito ................................ | 180/179 |

FOREIGN PATENT DOCUMENTS

| | | | |
|---|---|---|---|
| 2654533 | 6/1978 | Fed. Rep. of Germany ...... | 364/426 |
| 60-204002 | 10/1985 | Japan . | |
| 0252906 | 12/1985 | Japan ................................ | 364/426 |
| 0287827 | 12/1986 | Japan ................................ | 180/170 |

OTHER PUBLICATIONS

U.S. Ser. No. 043,468, filed Apr. 28, 1987.

Primary Examiner—Parshotam S. Lall
Assistant Examiner—V. Trans
Attorney, Agent, or Firm—Lowe, Price, LeBlanc, Becker & Shur

[57] ABSTRACT

A system and method for automatically controlling a vehicle speed to a desired cruising speed are disclosed in which learning of control parameters in an operating variable for an engine speed adjusting means such as throttle valve is inhibited when a disturbance occurs such as when running resistance of the vehicle is out of a normal range.

12 Claims, 7 Drawing Sheets

SYSTEM AND METHOD FOR AUTOMATICALLY CONTROLLING CRUISING SPEED OF VEHICLES

BACKGROUND OF THE INVENTION (1) Field of the Invention

The present invention relates to a system and method for automatically controlling cruising speed of a vehicle having a learning function to optimize operation control parameters during a period of running control operation of the vehicle using the system.

(2) Background Art

Automatic cruising speed controlling apparatus (so called, Auto Speed Control Device: ASCD) are mounted on vehicles in which, when a desired cruising speed is set during the ASCD operation, the vehicle can run at the desired cruising speed without operation of the accelerator pedal of the vehicle.

One of such automatic cruising speed controlling apparatus will be described below.

When a main switch of the cruising speed controlling apparatus is turned to ON, a contact of an ASCD relay is closed to transmit a power supply voltage to a controller.

When any one of set switch, resume (reset) switch, and an accelerate switch is operated in a given state, the controller receives a signal indicative of a vehicle speed from a vehicle speed sensor. Then, the controller sets, modifies, and stores a target vehicle speed. When the vacuum valve, ventilation valve, and/or safety release valve of a throttle actuator is appropriately actuated, the opening angle of the throttle valve of the vehicular engine is controlled by means of a diaphragm actuator. The diaphragm actuator includes the vacuum valve, ventilation valve, and release valve.

In addition, the controller outputs a signal to an A/T (Automatic transmission) controller to control gear selection of the transmission so that the vehicle speed remains constant even when load on the vehicle varies.

When the ASCD is operated to cruise the vehicle at the desired cruising speed, control parameters $K_1$ and $K_2$ are previously determined. An operation variable u of the throttle valve opening angle is determined from such a control arithmetic operation equation as $u = K_1 e + K_2 \Delta e$. In the equation, e denotes control deviation, i.e., the difference between the target vehicle speed $v_s$ and current vehicle speed v ($e = v_s < v$) derived from the vehicle speed sensor and $\Delta e$ denotes one step difference ($\Delta e = e' - e$) between the current vehicle speed e and the previous vehicle speed $e'$ one control period before.

When the ASCD operation is cancelled, the vehicle speed value at the time of cancelling the ASCD operation is stored as a stored vehicle speed. Thereafter, when the resume switch is operated, the vehicle speed is returned to the stored vehicle speed.

However, since control constants, i.e., the control parameters $K_1$ and $K_2$ in the equation $u = K_1 e + K_2 \Delta e$ are varied according to a model of the vehicle using the system, a certain time is required to determine the values of the control parameters $K_1$ and $K_2$.

To avoid having to make the determinations of the control parameters, another automatic cruising speed controlling apparatus has been proposed in which a learning function is provided as a part of determining constants, e.g., control parameters to achieve a self calibrating operation.

In detail, the automatic cruising speed controlling apparatus detects the current vehicle speed value v derived from the vehicle speed sensor. The controller installed in the system calculates the control deviation e and one step difference $\Delta e$ from the current vehicle speed v and target vehicle speed $v_s$ and substitutes the calculated control variation e and one step difference $\Delta e$ into the control arithmetic operation equation $u = K_1 e + K_2 \Delta e$. In this way, the operating variable u of the opening angle of the throttle valve is determined so that the vehicle speed approaches the target value.

In the above-described controller, only the above-described control operation is repeated when an evaluation start section thereof is commerced in the control operation mode of, e.g., a resume operation to return the vehicle speed to the original set vehicle speed. On the other hand, the evaluation operation goes to a learning operation mode and the learning of the control parameters $K_1$ and $K_2$ is carried out to optimize the control parameters $K_1$ and $K_2$.

That is to say, the control parameters $K_1$ and $K_2$ which do not generate large errors in normal states are previously set irrespective of vehicle operation characteristics. When the vehicle runs at the cruising speed with the above-described ASCD system operated, an overshooting or undershooting of control frequently occurs due to inappropriate setting of the control parameters for the individual vehicle using the system.

Therefore, control characteristics of the system during a given control period are evaluated by means of an evaluation part in the controller when the evaluation start section is operated. To achieve more appropriate control characteristics, the control parameters $K_1$ and $K_2$ are reviewed and updated on the basis of the evaluation results in a control parameter change operation section thereof.

In addition, when the above-described control procedure is again started, the control characteristics are evaluated and reviewed and the control parameters $K_1$ and $K_2$ are updated according to the evaluation results so as to produce optimum control parameters.

However, the evaluation and review for the vehicle speed control characteristics are difficult due to difficulty in obtaining most appropriate control characteristics in the previously proposed automatic cruising speed controlling system. In addition, when the control characteristics to be evaluated peculiarly respond due to an occasional generation of disturbance, the automatic cruising speed controlling system cannot detect the peculiarly responded control characteristics. Therefore, the system evaluates and learns the control parameters to follow the peculiar response. Consequently, the control characteristics in response to normal operating conditions becomes worsened and hunting of the vehicle speed occurs with or without disturbance.

SUMMARY OF THE INVENTION

It is, therefore, an object of the present invention to provide an improved system and method for automatically controlling cruising speed of a vehicle in which control parameters in a control arithmetic operation equation for the cruising speed control are quickly and smoothly converged to optimum values.

The above-described object can be achieved by providing a system for automatically controlling a vehicle speed to a desired cruising speed, comprising: (a) first means for optimizing control parameters in an operating variable required for the vehicle speed to reach the desired cruising speed through a learning operation, (b)

second means for detecting an occurrence of disturbance during the control of the vehicle speed to reach the desired cruising speed, and (c) third means for inhibiting the learning of the control parameters when the second means detects the occurrence of disturbance.

The above-described object can also be achieved by providing a system for automatically controlling cruising speed of a vehicle, comprising: (a) first means for optimizing control parameters for cruising speed control operation of the system through a learning operation, (b) second means for detecting a running resistance of the vehicle, (c) third means for determining whether the detected running resistance of the vehicle falls within a predetermined range including a predetermined value of running resistance, and (d) fourth means for inhibiting the learning when the third means determines that the detected running resistance of the vehicle falls outside of the predetermined range.

The above-described object can also be achieved by providing a method for automatically controlling a vehicle speed to a desired cruising speed, comprising the steps of: (a) optimizing control parameters in the operating variable required for the vehicle speed to reach the desired cruising speed through a learning operation, (b) detecting an occurrence of abnormal conditions during the operation to control the vehicle speed to reach the desired cruising speed, and (c) inhibiting the learning carried out in the step (a) when detecting the occurrence of abnormal conditions at the step (b).

DETAILED DESCRIPTION OF THE PREFERRED EMBODIMENTS

Reference will hereinafter be made to the drawings in order to facilitate understanding of the present invention.

Figure 1:
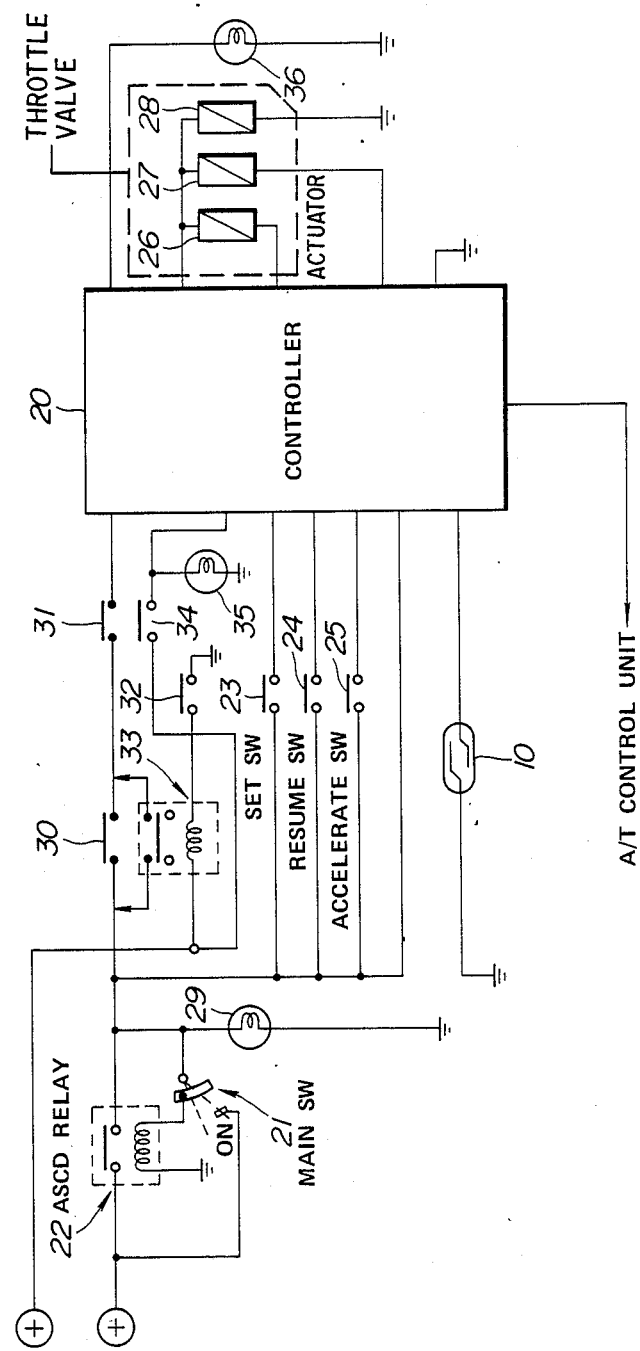
FIG. 1 is a simplified circuit block diagram of a system for automatically controlling cruising speed of a vehicle in a first preferred embodiment according to the present invention.

FIG. 1 shows a circuit block diagram of a system for automatically controlling a cruising speed of a vehicle according to the present invention.

In FIG. 1, a controller 20 is operated when a main switch 21 is turned to ON to close contacts of an ASCD relay 22. The term "ASCD" is an abbreviation for Automatic Speed Control Device.

The structure of the automatic cruising speed controlling system shown in FIG. 1 is also exemplified by U.S. patent application Ser. No. 055,516 filed on May 29, 1987, and Ser. No. 043,532 filed on April 28, 1987.

The two above-identified United States Patent Applications are hereby incorporated by reference.

In addition, the controller 20 outputs a signal to an A/T control unit to control a gear shift position so that the vehicle speed is substantially maintained constant even when load on the vehicular engine is varied.

In FIG. 1, numeral 29 denotes an indicator lamp, numeral 30 denotes a clutch switch, numeral 31 denotes a brake switch, numeral 32 denotes an inhibitor switch, numeral 33 denotes an inhibitor relay, numeral 34 denotes a stop lamp switch, numeral 35 denotes a stop lamp, and numeral 36 denotes a cruise lamp. In FIG. 1, numeral 26, denotes a vent valve, numeral 27 denotes a safety valve, and numeral 28 denotes a vacuum valve. These valves receive signals outputted from the controller 20 and actuates the throttle valve.

Figure 2:
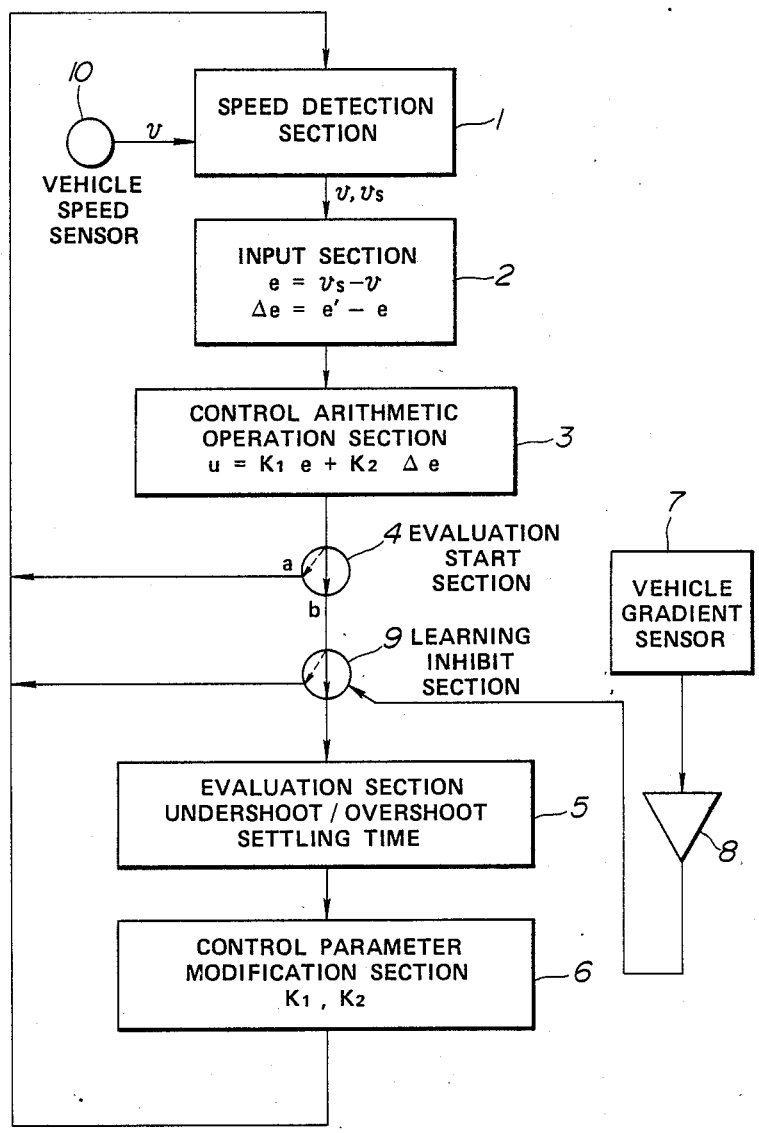
FIG. 2 is a functional block diagram of the automatic cruising speed controlling system in the first preferred embodiment shown in FIG. 1.

FIG. 2 shows a functional block diagram of the automatic cruising speed controlling system in a first preferred embodiment.

In a speed detection section 1, a vehicle speed signal is received from the vehicle speed sensor 10 to detect the current vehicle speed v.

In an input section 2, control deviation e from the current vehicle speed v and a target vehicle speed $v_s$ and a control differential $\Delta e$ between the control deviations ($\Delta e = e' - e$) at the current vehicle speed and a previous vehicle speed obtained in the previous control period is calculated.

In a control arithmetic operation section 3, the values e and $\Delta e$ derived by the input section 2 are added into a control arithmetic operation equation in a control arithmetic operation section 3: $u = K_1 e + K_2 \Delta e$.

Thus, the operating variable u representing a quantity on an opening angle of the throttle valve is determined so as to cause the vehicle speed to approach the target value.

When a switch is actuated by the integrated evaluation starting section 4 into the position denoted, until several seconds have passed, e.g., start of a resume operation through the resume switch 24, only the above-described control operation is repeated. However, when the switch is actuated into a b position, after the several seconds the control parameters $K_1$ and $K_2$ are then evaluated and optimized in a learning section denoted by 5 and 6.

In the first preferred embodiment, a vehicle gradient sensor 7 for detecting a gradient of the vehicle, an amplifier section 8 for analyzing the output from the vehicle gradient sensor 7, and a learning inhibit section 9 for inhibiting the learning operation according to the analyzation result of the amplifier section 8. It is noted that the vehicle gradient sensor 7 functions as means for detecting a running resistance of the vehicle. The running resistance R is usually calculated as follows: $R = W \sin\theta + \mu_r W + \mu_l A v^2$, wherein W denotes a total weight of the vehicle, $\theta$ denotes an angle between a gradient plane and a horizontal plane, $\mu_r$ denotes a rolling resistance coefficient, $\mu_l$ denotes an air resistance coefficient, and A denotes a frontal projected area.

Therefore, if the coefficients W, $\mu_r$, $\mu_l$, A, and v are previously derived, the running resistance R can be derived using the value $\theta$ derived from the vehicle gradient sensor 7. The vehicle gradient sensor 7, e.g., comprises a weight attached to a drive gear supported vertically on an indicator, the indicator indicating the angle $\theta$.

An evaluation section 5 evaluates the control operations executed during a certain period of time, e.g., after the resume operation is carried out and a control parameter modification section 6 reviews and updates the control parameters $K_1$ and $K_2$ according to the results obtained in the evaluation section 5.

Next, an operation of the first preferred embodiment will be described.

Suppose, for example, that the resume switch 24 is operated to return the current vehicle speed to a previously set cruising speed (the previous target value of the vehicle speed before the resume operation) is carried out while the control parameters $K_1$ and $K_2$ do not match with the current vehicle characteristics.

During the resume operation of the automatic cruising speed controlling system under predetermined running conditions, the evaluation start section switch 4 is operated to start evaluation of the control parameters $K_1$ and $K_2$.

At this time, suppose that the vehicle is running on a slope whose grade can be expressed as $S_1\%$ during the resume operation. If $S_1=0$, no problem occurs. However, if $S_1$ is 1.5% or more, down shifting of the gears is carried out in the resume operation at an earlier time than during the normal resume operation taking place when the vehicle is running on a flat road. Consequently, the vehicle response characteristics are different from those at the time of the normal resume operation.

The learning of the control parameters $K_1$ and $K_2$ under such conditions as described above is not preferable. In other words, if the control results are evaluated and the control parameters $K_1$ and $K_2$ are updated, overshooting usually occurs in the subsequent normal resume operation which is performed while the vehicle is running on a substantially flat road.

In the first preferred embodiment, the grade of the road (vehicle gradient) is detected by means of the vehicle gradient (grade) sensor 7 and is supplied to the amplifier section 8. The amplifier section 8 determines whether the detected grade (which corresponds to a running resistance value) falls in a range of $\pm$ S (S denotes a constant value) with respect to a previously set value. When the detected grade does not fall in the range, the amplifier section 8 sets a learning inhibit flag to a learning inhibit section 9.

Consequently, since the learning inhibit flag is set in the learning inhibit section 9, the controller 20 does not correct the control parameters according to the response characteristics obtained in evaluation section 6 for a predetermined time after the resume operation has ended. That is to say, the controller 20 determines that the present resume operation is not to be learned due to a presence of disturbance and halts the learning of the control parameters (dotted arrow mark denoted in the section 9 of FIG. 2 shows this case).

Figure 3:
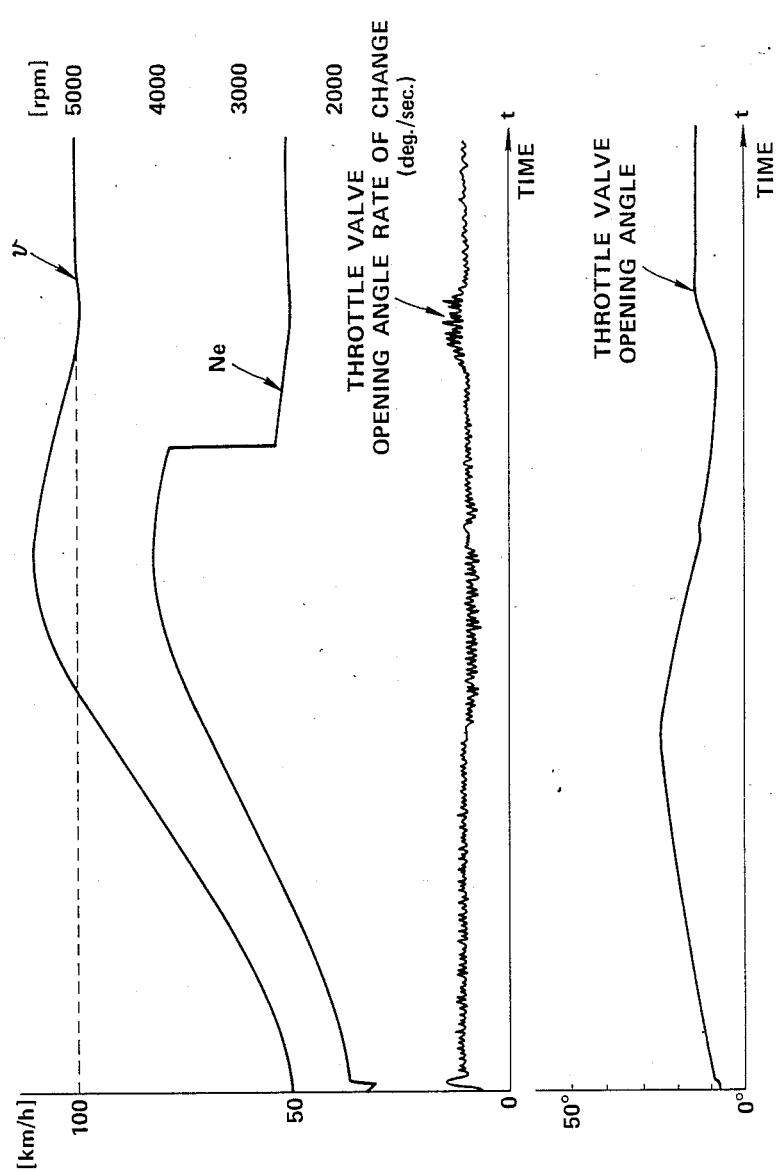
FIG. 3 is vehicle operating characteristics graph at a time before control parameters are optimized through the automatic cruising speed controlling system in the first preferred embodiment.

FIG. 3 is a graph showing characteristics of the relationships between the vehicle speed, engine speed, rate of change of the throttle valve opening angle, and opening angle of the throttle valve during the resume operation before the optimization of control parameters.

Figure 4:
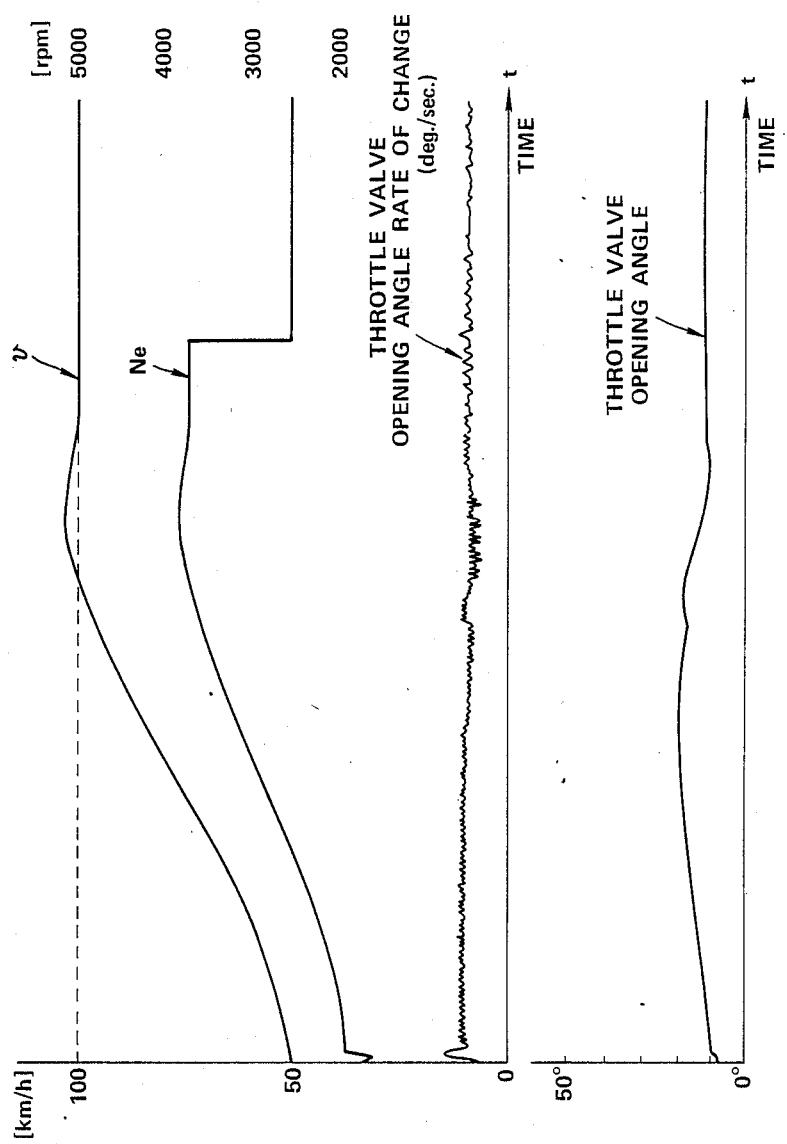
FIG. 4 is a vehicle operating characteristics graph at a time when the control parameters are optimized in a previously proposed automatic cruising speed controlling system.

FIG. 4 is a graph showing characteristics the same relationships as those shown in FIG. 3 in which the control parameters $K_1$ and $K_2$ are not optimized through the learning operation and the vehicle is running on a slope having a 3% grade during one learning operation from among three with a previously proposed automatic cruising speed controlling system described in the BACKGROUND OF THE INVENTION.

Figure 5:
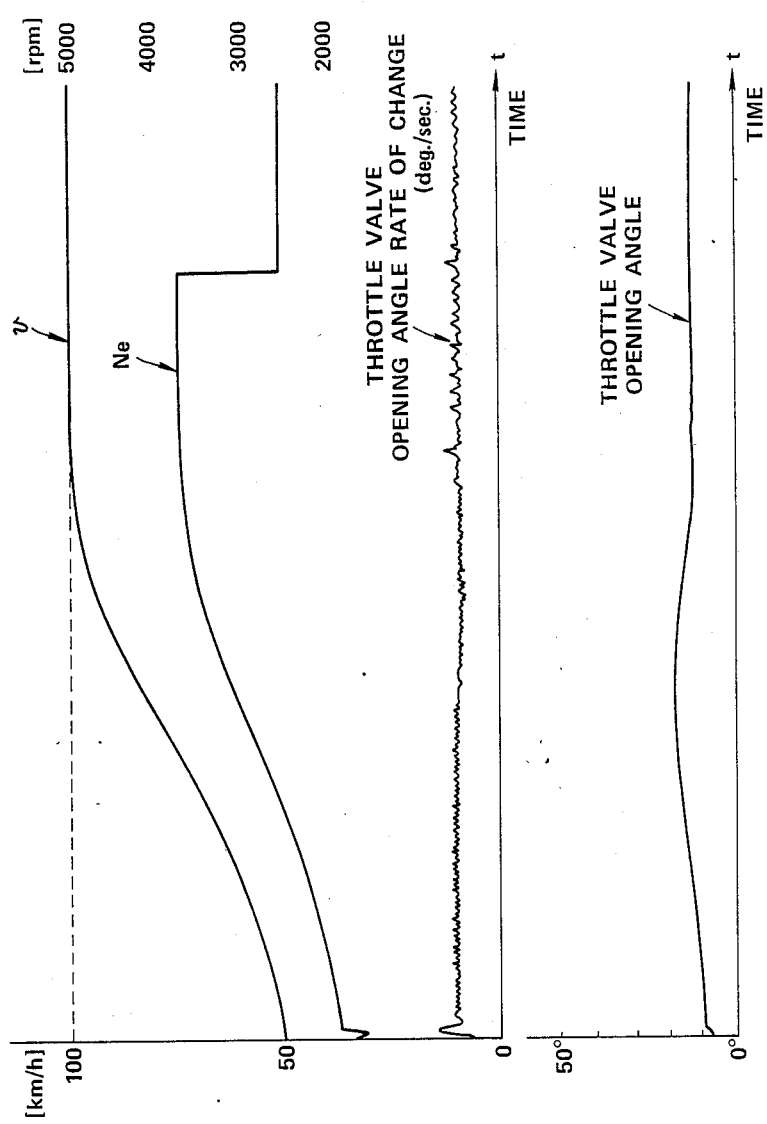
FIG. 5 is a vehicle operating characteristics graph at a time when the control parameters are optimized in the automatic cruising speed controlling system of the first preferred embodiment.

FIG. 5 is a graph depicting of the same relationships as those shown in FIG. 3 in which the learning of the vehicle response characteristiacs is is inhibited while the vehicle is running on a slope and the control parameters are subsequently learned twice as the vehicle runs on a flat road.

As shown in FIGS. 3, 4, and 5, the vehicle speed most quickly converges the target vehicle speed in the case of the first preferred embodiment and the optimization of control parameters is most quickly carried out.

Figure 6:
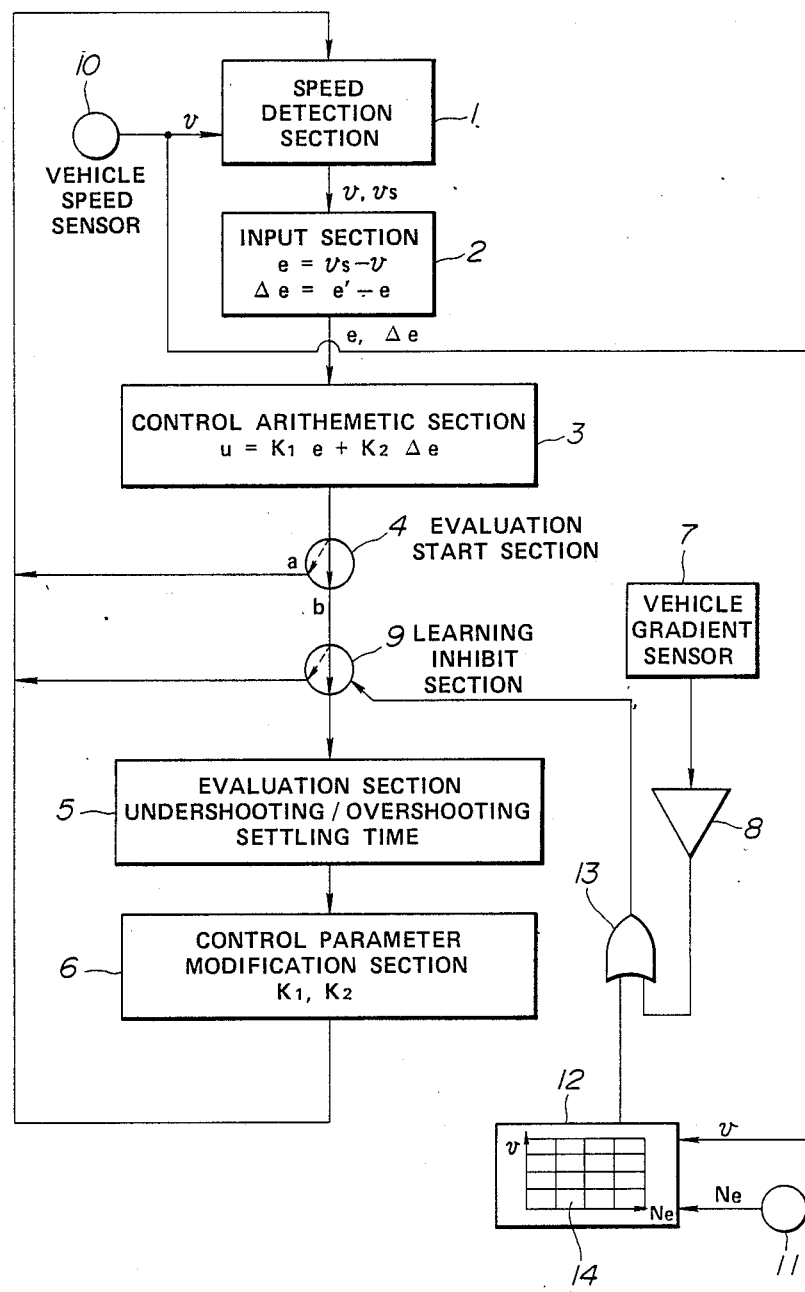
FIG. 6 is a functional block diagram of the automatically cruising speed controlling system in a second preferred embodiment.

FIG. 6 shows a functional block diagram of the automatic cruising speed controlling system in a second preferred embodiment.

The like reference numerals shown in FIG. 6 designate corresponding elements shown in FIG. 2.

The second preferred embodiment is applicable to a vehicle having a manual transmission (M/T).

In the second preferred embodiment, the controller 20 derives the vehicle speed from the vehicle speed sensor 10 and engine speed from an engine speed sensor 11 and determines whether the present vehicle operating conditions are appropriate for learning.

As shown in FIG. 6, an evaluation start determination circuit 12 receives the signal indicative of the vehicle speed v from the vehicle speed sensor 10 and the signal indicative of the engine speed from the engine speed sensor 11. An OR gate circuit 13 receives output signals from the evaluation start determination circuit 12 and from the amplifier section 8 and outputs an OR signal to the learning inhibit circuit 9.

The evaluation start determination circuit 12 is provided with a table 14 representing the vehicle speed v with respect to the engine speed Ne. In addition, a learning enabled flag, i.e., indicating that the evaluation start is enabled is set in a vehicle speed range corresponding to a normal driving state in which the running resistance value falls in a predetermined range. On the other hand, since the control at the time of normal operation may become adversely affected due to learning under other conditions, the learning inhibit flag is set to inhibit the evaluation start under abnormal conditions.

For example if a driver erroneously positions a shifting handle of the transmission so the engine speed is higher than it should be for optimum performance, since the relationship between the vehicle speed v and engine speed Ne is different from normal, the evaluation start determination circuit 12 outputs the learning inhibit signal to the learning inhibit section 9 via the OR gate circuit 13 so that the learning inhibit flag is set.

In the second preferred embodiment, the evaluation start determination section 12 serves as means for detecting the running resistance of the vehicle and means for inhibiting learning.

It is noted that the second preferred embodiment is also applicable for vehicles with automatic transmissions (A/T).

When the second preferred embodiment is used in A/T transmission vehicle, the grade sensor 7 as shown in FIG. 2 may be omitted and the enable or disable of the learning function may be determined from the table on the vehicle speed v and engine speed Ne.

In addition, means for detecting weight of the vehicle and means for detecting wind pressure may be installed as the means for detecting the running resistance.

The present invention is also applicable to automatic cruising speed controlling systems in which an operating variable is derived from a fussy estimation calculation disclosed in, e.g., a Japanese Patent Application First (non-examined) Publication sho 60-204,002 published on October 15, 1985.

In the above-identified Japanese Patent Application First Publication, the fussy estimation calculation is carried out in a fussy adjustment apparatus using a process measurement value and a process situation value as the result of a determination made by a driver (operator), and the calculation result is outputted as a process control output.

A pseudo fussy estimation calculation system for the fussy adjustment in which a process measurement value and a process situation value determined by an operator are inputted, an arithmetic operation is carried out using the process measurement values and process situation values, the feature of which being the system comprising (a) first means for storing rules used in the fussy estimation calculation, parameters used for definitions such as fussy variables and membership functions; (b) second means for calculating a pseudo fussy estimation calculation; (c) third means for retrieving an arbitrary desired parameter from the first means and inputting it to the second means; (d) fourth means for displaying the result of the pseudo fussy estimation calculation carried out for the process measurement value and process situation value using the rules defined by parameters inputted by the second means; and (e) fifth means for replacing old parameters used in the pseudo fussy estimation calculation with new parameters.

Figure 7:
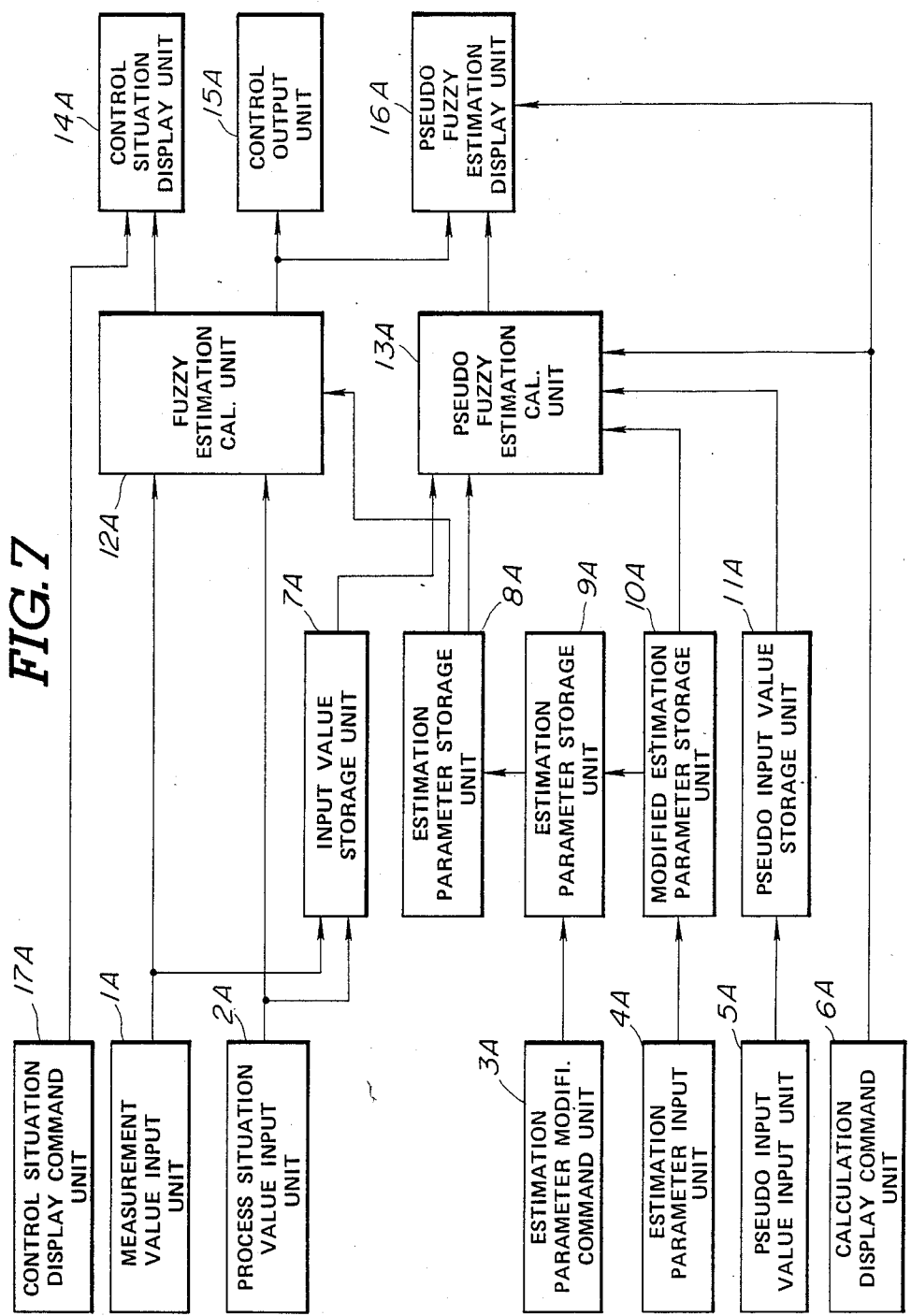
FIG. 7 is a functional block diagram of a fuzzy adjustment system disclosed in a Japanese Patent Application First Publication (non-examined) sho60-204,002 to which the present invention is applicable.

FIG. 7 shows a block diagram of a preferred embodiment of the fussy adjustment system described above.

As described hereinabove, since in the automatic cruising speed controlling system according to the present invention means for determining whether the present control characteristics of the control parameters for the opening angle of the throttle valve can serve as a model to be learned depending upon the running resistance of the vehicle is provided in the learning function of the control parameters so that the learning is inhibited according to the result of determination described above, the convergence of the control parameters to the optimum values can speed up through performing the learning operation under normal driving condition and not learning response characteristics obtained under abnormal driving conditions such as steep slope or erroneous gear position.

It will fully be understood by those skilled in the art that the foregoing description has been made in terms of the preferred embodiments and various changes and modifications may be made without departing from the scope of the present invention which is to be defined by the appended claims.

What is claimed is:

1. A self-adapting universal system for automatically controlling a vehicle speed of a particular vehicle to a desired cruising speed, comprising:
    (a) first means for optimizing control parameters $K_1$ and $K_2$ of an operating variable u for an engine driving force adjusting mechanism of the vehicle required for a vehicle speed to reach the desired cruising speed through a learning operation during vehicle operation to derive values of the control parameters $K_1$ and $K_2$ defining the operating variable u of the engine driving force adjusting mechanism using the optimized control parameters wherein the operating variable u is defined as $u = K_1 e + K_2 \Delta e$, wherein $K_1$ and $K_2$ represent the control parameters, e represents a difference between a present vehicle speed and a target vehicle cruising speed, and $\Delta e$ represents a step difference between the control difference e and that of an e' of a prior control period ($\Delta e = e' - e$);
    (b) second means for detecting an occurrence of a predetermined disturbance known to affect the engine driving force required to reach and maintain a predetermined vehicle speed; and
    (c) third means for inhibiting the learning of the control parameters $K_1$ and $K_2$ when the second means detects the occurrence of said predetermined disturbance.

2. A system as set forth in claim 1, wherein the second means comprises means for detecting engine speed, and means for determining if a predetermined normal relationship between the vehicle speed and engine speed is satisfied.

3. A system as set forth in claim 1, wherein the second means for detecting an occurrence of a predetermined disturbance comprises;
    fourth means for detecting running resistance of the vehicle wherein said running resistance is based on one or more engine driving force parameters affecting said operating variable of the engine driving force, said engine driving force parameters including a weight of said vehicle, a gradient of said vehicle, a rolling resistance coefficient of said vehicle, an air resistance coefficient, and a frontal area of said vehicle, and
    fifth means for determining whether the detected running resistance of the vehicle falls within a predetermined range of the running resistance and wherein the third means inhibits the learning of the control parameters when the fifth means determines that the detected running resistance falls outside of the predetermined range.

4. The system as set forth in claim 3, wherein the fourth means comprises sixth means for detecting a grade of the road and the fifth means determines whether the detected grade falls outside of a predetermined range of the gradient of the vehicle.

5. A universal system for automatically controlling a cruising speed of a particular vehicle, comprising:
    (a) first means for automatically optimizing engine control parameters $K_1$ and $K_2$ for said particular vehicle for cruising speed control operation of the vehicle through a learning operation responsive to feedback signals derived from selected vehicle operating parameters to set and correct said control parameters $K_1$ and $K_2$ for said vehicle wherein said control operation is responsive to an operating variable u expressed as $u = K_1 e + K_2 \Delta e$, wherein $K_1$ and $K_2$ represent the control parameters, e represents a difference between a present vehicle speed and a target vehicle cruising speed, and $\Delta e$ represents a step difference between the control difference e and the of an e' of a prior control period ($\Delta e = e' - e$);
    (b) second means for detecting a running resistance of the vehicle;

(c) third means for determining whether the detected running resistance of the vehicle falls within a predetermined nominal range of running resistance; and (d) fourth means for inhibiting the learning operation when the third means determines that the detected running resistance of the vehicle falls outside of the predetermined nominal range.

6. A system as set forth in claim 5, wherein the second means comprises fifth means for detecting grade of a road and wherein the third means determines whether the detected grade falls within a predetermined range.

7. A system as set forth in claim 5, wherein the control parameters are factors used for determining an optimal engine speed of said vehicle.

8. A system as set forth in claim 7, which further comprises fifth means for detecting said present vehicle speed.

9. A system as set forth in claim 7, wherein the operating variable is applied to a pseudo fuzzy calculation.

10. A system as set forth in claim 7, wherein the engine speed determining means includes a throttle valve and throttle actuator.

11. An adaptive method for automatically controlling a vehicle speed of a particular vehicle to a desired cruising speed, comprising the steps of:

(a) optimizing control parameters $K_1$ and $K_2$ defining an operating variable u required for the vehicle speed to reach the desired cruising speed through a learning operation wherein said control parameters are determined and updated and wherein an operating variable u is defined as $u = K_1 e + K_2 \Delta e$, wherein $K_1$ and $K_2$ represent the control parameters, e represents a difference between a present vehicle speed and a target vehicle cruising speed, and $\Delta e$ represents a step difference between the control difference e and an e' of a prior control period ($\Delta e = e' - e$);

(b) detecting an occurrence of an abnormal operating condition during the operation of said vehicle to control the vehicle speed to reach the desired cruising speed; and (c) inhibiting the learning carried out in step (a) when detecting the occurrence of said abnormal condition at step (b).

12. A self adapting system for automatically controlling a vehicle speed of a particular vehicle to a desired cruising speed, comprising:

(a) first means for optimizing control parameters $K_1$ and $K_2$ of an operating variable u for an engine driving force adjusting mechanism of the particular vehicle required for the vehicle speed to reach the desired cruising speed through a learning operation to derive optimized values of the control parameters and for controlling the operating variable of the engine driving force adjusting mechanism for said particular vehicle using the optimized control parameters wherein the operating variable u is expressed as $u = K_1 e + K_2 \Delta e$, wherein $K_1$ and $K_2$ represent the control parameters, e represents a difference between a present vehicle speed and a target vehicle cruising speed, and $\Delta e$ represents a step difference between the control difference e and the of an e' of a prior control period ($\Delta e = e' - e$);

(b) second means for detecting an occurrence of a disturbance that affects the engine driving force required for the vehicle speed to reach the desired cruising speed; and (c) third means for inhibiting the learning of the control parameters when the second means detects the occurrence of said disturbance.

* * * * *